(12) United States Patent
Hall, Jr.

(10) Patent No.: US 7,587,819 B1
(45) Date of Patent: Sep. 15, 2009

(54) INSERT FOR A CATALYTIC CONVERTER AND METHOD AND APPARATUS FOR FORMING AN INSERT FOR A CATALYTIC CONVERTER

(76) Inventor: Herbert L. Hall, Jr., 1371 Pleasant Valley Rd., Newark, OH (US) 43055

( * ) Notice: Subject to any disclaimer, the term of this patent is extended or adjusted under 35 U.S.C. 154(b) by 754 days.

(21) Appl. No.: 10/744,284

(22) Filed: Dec. 23, 2003

Related U.S. Application Data

(60) Provisional application No. 60/436,049, filed on Dec. 23, 2002.

(51) Int. Cl.
- *B01D 50/00* (2006.01)
- *B21D 39/00* (2006.01)
- *B21D 51/16* (2006.01)
- *B23K 31/02* (2006.01)
- *B23P 15/26* (2006.01)

(52) U.S. Cl. .................. 29/890; 29/890.043; 29/890.08; 228/181; 422/177; 422/179; 422/180; 428/116; 428/593; 502/439

(58) Field of Classification Search .............. 29/890, 29/890.043, 890.08, 890.09; 422/177, 179, 422/180, 168; 502/439; 428/116, 369.1, 428/593; 228/181
See application file for complete search history.

(56) References Cited

U.S. PATENT DOCUMENTS

| | | | |
|---|---|---|---|
| 3,843,561 A * | 10/1974 | Sobfl | 502/339 |
| 3,912,459 A * | 10/1975 | Kearsley | 422/179 |
| 4,049,388 A * | 9/1977 | Scheitlin et al. | 422/171 |
| 4,559,205 A | 12/1985 | Hood | |
| 4,581,206 A * | 4/1986 | Otani et al. | 422/171 |
| 4,795,616 A | 1/1989 | Mondt et al. | |
| 5,055,274 A * | 10/1991 | Abbott | 422/171 |
| 5,118,476 A | 6/1992 | Dryer et al. | |
| 6,185,819 B1 * | 2/2001 | Bauer et al. | 29/890 |
| 6,365,267 B1 | 4/2002 | Langer et al. | |
| 6,499,204 B2 | 12/2002 | Hayashi | |
| 6,568,078 B2 * | 5/2003 | Eisenstock | 29/890 |
| 6,623,704 B1 | 9/2003 | Roth | |
| 6,635,227 B1 | 10/2003 | Shibata et al. | |
| 6,705,012 B1 * | 3/2004 | Harle et al. | 29/890 |
| 7,179,431 B2 * | 2/2007 | Lesher et al. | 422/180 |
| 7,252,808 B2 * | 8/2007 | Tursky | 422/179 |
| 2001/0036432 A1 | 11/2001 | Hu et al. | |
| 2002/0108428 A1 * | 8/2002 | Klein | 72/356 |
| 2002/0146354 A1 * | 10/2002 | Huang et al. | 422/168 |
| 2002/0189097 A1 * | 12/2002 | Collins et al. | 29/890 |
| 2002/0192426 A1 | 12/2002 | Ichikawa et al. | |
| 2003/0154600 A1 * | 8/2003 | Umeda et al. | 29/890 |
| 2003/0165414 A1 | 9/2003 | Galligan et al. | |
| 2004/0009106 A1 | 1/2004 | Galligan et al. | |

\* cited by examiner

*Primary Examiner*—David P Bryant
*Assistant Examiner*—Alexander P Taousakis
(74) *Attorney, Agent, or Firm*—MacMillan, Sobanski & Todd, LLC

(57) ABSTRACT

A method of forming an insert for a catalytic converter includes wrapping a catalytic core with a fibrous packing, inserting the wrapped core into a mantle, and forming end portions of the mantle into converging tapered portions capable of retaining the wrapped core in place within the mantle.

17 Claims, 3 Drawing Sheets

INSERT FOR A CATALYTIC CONVERTER AND METHOD AND APPARATUS FOR FORMING AN INSERT FOR A CATALYTIC CONVERTER

RELATED APPLICATIONS

This application claims priority from U.S. Provisional Patent Application Ser. No. 60/436,049, filed Dec. 23, 2002, and INSERT FOR A CATALYTIC CONVERTER AND METHOD AND APPARATUS FOR FORMING AN INSERT FOR A CATALYTIC CONVERTER.

TECHNICAL FIELD

This invention relates to catalytic converters and to methods and apparatus for forming catalytic converters. More particularly, the invention related to catalytic converters comprising a inner catalytic core material, an outer shell or mantle, and a packing material intermediate the core and the mantle.

BACKGROUND OF THE INVENTION

Catalytic converters are used to reduce or convert certain exhaust gas emissions from an internal combustion or turbine engine. One example of a catalytic converter involves a metallic housing, referred to as a can or mantle, into which is inserted a ceramic core. The ceramic core has a multiplicity of passageways or honeycomb structure defined by thin walls coated with the catalyst to provide the maximum contact possible between the catalyst and the exhaust gases flowing through the catalytic converter. In some catalytic converters, the relatively fragile ceramic core material is wrapped with a mat of fibrous packing material to help hold the core in place within the mantle, and to help protect the core from mechanical and thermal shock during handling of the catalytic converter and during operation of the vehicle or other equipment into which the catalytic converter is installed. Intumescent materials are also used as packing materials. One particular type of catalytic converter is a diminutive catalytic converter, which is especially suited for insertion into individual exhaust manifold ports, or for incorporation into small engine exhaust systems such as lawn mowers, chainsaws, mopeds, motorcycles and the like.

Once a combustion engine is started, typical catalytic converters require a short time interval for heat build-up to bring converter up to operational temperature. Meanwhile, the exhaust passing through the system is not properly treated. Due to ever stringent clean air standards being imposed on manufacturers of internal combustion engines, it is becoming more imperative to have the catalytic converter light-off (begin to function) earlier, as soon as possible after engine start-up in order to reduce this source of exhaust gas emissions. Manufacturers of these devices have attempted a number of means whereby catalytic converters may be quickly brought up to operational temperatures. Some methods involve preheating the catalyst and catalytic converter before engine start, while other approaches involve physically locating the catalytic converter closer to the exhaust manifold. Still other approaches involve insulating the exhaust pipe leading from the exhaust manifold to the catalytic converter. Each of these approaches has been found to be problematic.

One approach to this problem is to locate discrete catalytic converter elements wholly within either each exhaust manifold port or each exhaust port of the engine itself, or, partly within each part when the two parts are assembled together. This is generally considered to be a distributed approach with the small catalytic converters close-coupled to its heat source (cylinder exhaust for internal combustion engines), while the larger primary converter is remotely located. Such catalytic converters must be able to withstand the rigors of placement in close proximity to the engine and its associated severe operating environment. The extremes of high temperatures and exhaust pressure pulses can quickly destroy a catalyst substrate and/or its supporting mat rendering the catalytic converter inoperable if it is not properly supported within a metal can or mantle. It is important that the catalyst substrate exhibits a minimal amount of resistance to exhaust gas flow from the engine.

It would be advantageous if there could be developed improved inserts for catalytic converters that could be made in an economical manner. Also, it would be helpful if there could be developed a method and apparatus for making such catalytic converter inserts.

SUMMARY OF THE INVENTION

The above objects as well as other objects not specifically enumerated are achieved by a method of forming an insert for a catalytic converter, with the method including wrapping a catalytic core with a fibrous packing, inserting the wrapped core into a mantle, and forming end portions of the mantle into converging tapered portions capable of retaining the wrapped core in place within the mantle.

According to this invention there is also provided an insert for a catalytic converter, with the insert including a catalytic core with a fibrous packing, and a mantle into which the core is inserted, the mantle having end portions formed into converging tapered portions capable of retaining the wrapped core in place within the mantle.

Various objects and advantages of this invention will become apparent to those skilled in the art from the following detailed description of the preferred embodiment, when read in light of the accompanying drawings.

DETAILED DESCRIPTION OF THE INVENTION

Figure 1:
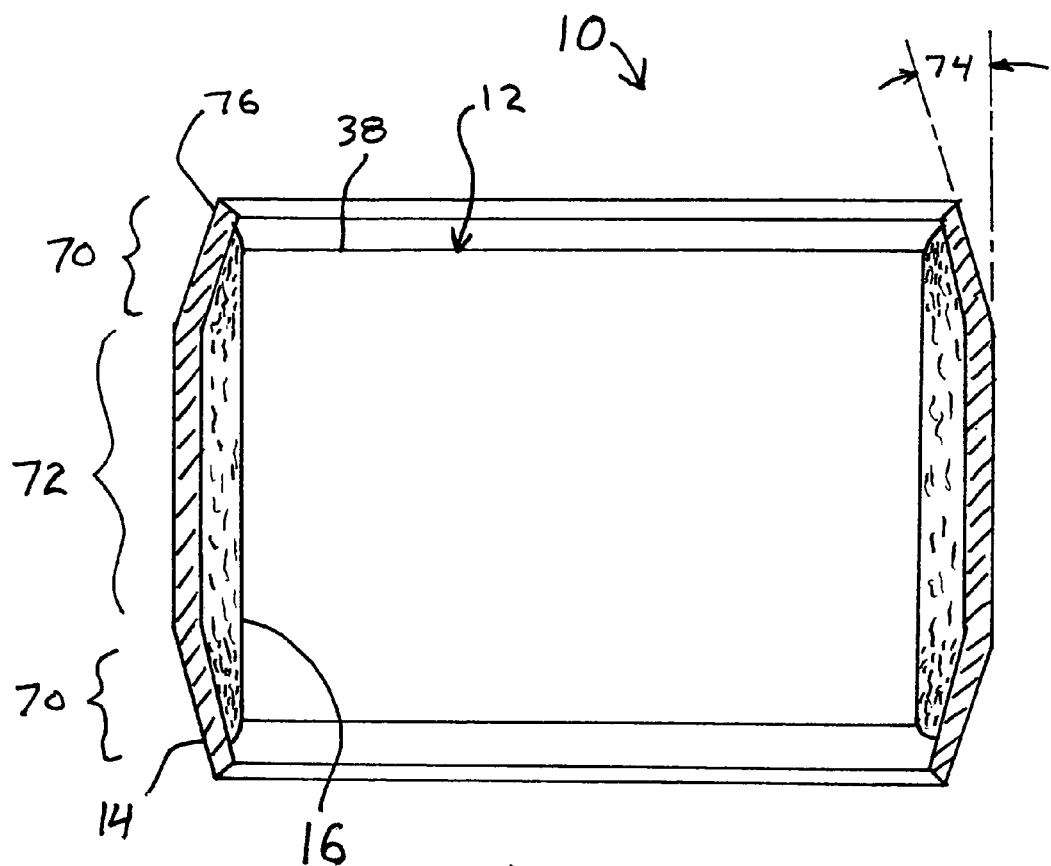
FIG. 1 is a cross-sectional view in elevation of a catalytic insert.

As shown in FIG. 1, a catalytic insert is indicated at 10. The insert 10 is comprised of a substrate or catalytic core 12, a can or mantle 14 surrounding the catalytic core 12, and a packing material 16 for retaining the catalytic core 12 in place within the mantle 14. The mantle 14 is preferably metallic, and more preferably formed of straight-walled stainless steel, Inconel, Hastelloy, or other high temperature metals. One suitable material is 304 stainless steel having a thickness within the range of from about 0.010 to about 0.040 inches, although other materials and thicknesses can be used. The catalytic insert 10 of the invention is suitable for insertion into an exhaust system for catalytic reaction with exhaust gases for a reduction in undesirable aspects of the exhaust gas.

The catalytic core 12 has a multiplicity of passageways or honeycomb structure defined by thin walls, not shown, that are coated with the catalyst to provide the maximum contact possible between the catalyst and the exhaust gases flowing through the catalytic converter. Catalytic cores are well known in the art, and can be made of any material suitable for supporting or retaining catalytic material in contact with a stream of exhaust gases flowing through the catalytic core 12. Preferably, the catalytic core is comprised of a ceramic material, and most preferably it is a high temperature resistant grade of cordierite material suited for internal combustion engine exhaust gases at service temperatures up to 2012 degrees F. (1100 degrees C.). The cordierite ceramic core 12 preferably consists of a honeycomb core structure which is comprised of elongated passageways for exhaust gases. The walls of the passageways can be any suitable thickness, such as, for example, a thickness of about 0.011 inches.

The walls of the interior passageways are partially or completely coated with the catalytic material, such as, for example, one or more platinum group catalysts. At typical service temperatures, hydrocarbons in the exhaust stream are oxidized and a portion of the carbon monoxide in the exhaust stream is also oxidized. Partial reduction of nitrous oxides may also take place. Optionally, the ceramic core has applied to the exterior of its cylindrical surface an electric arc-sprayed coating by which the exterior surface of the catalytic core 12 is modified by being roughened. The roughened exterior surface helps secure the packing material 16 on the catalytic core 12 during insertion of the catalytic core into the mantle. It is to be understood that other application methods besides electric arc spraying can be used to apply the coating to roughen the surface.

Due to the thinness of the walls of the passageways, the ceramic core 12 is relatively fragile. The ceramic catalytic core 12 is wrapped in the packing material 16 to help hold the core in place within the mantle. Optimally, the packing material 16 is a fibrous material, although other forms of material, such as intumescent materials, can also be used as packing material. The fibrous packing material 16 also protects the core from mechanical shock during handling of the catalytic converter and from thermal shock during operation of the vehicle or other equipment into which the catalytic converter is installed. A preferred fibrous packing material 16 is in the form of a high alumina mineral fiber mat that is positioned circumferentially around the catalytic core 12. Preferably, the mat is a single-layer, 3 micron diameter high-alumina fiber product with a bulk density within the range of from about 0.04 to about 0.08 g/ml. Such a mat is commercially available from Saffil Automotive Limited of Widnes, United Kingdom, and sold under the trademark SAFFIL™.

Figure 2:
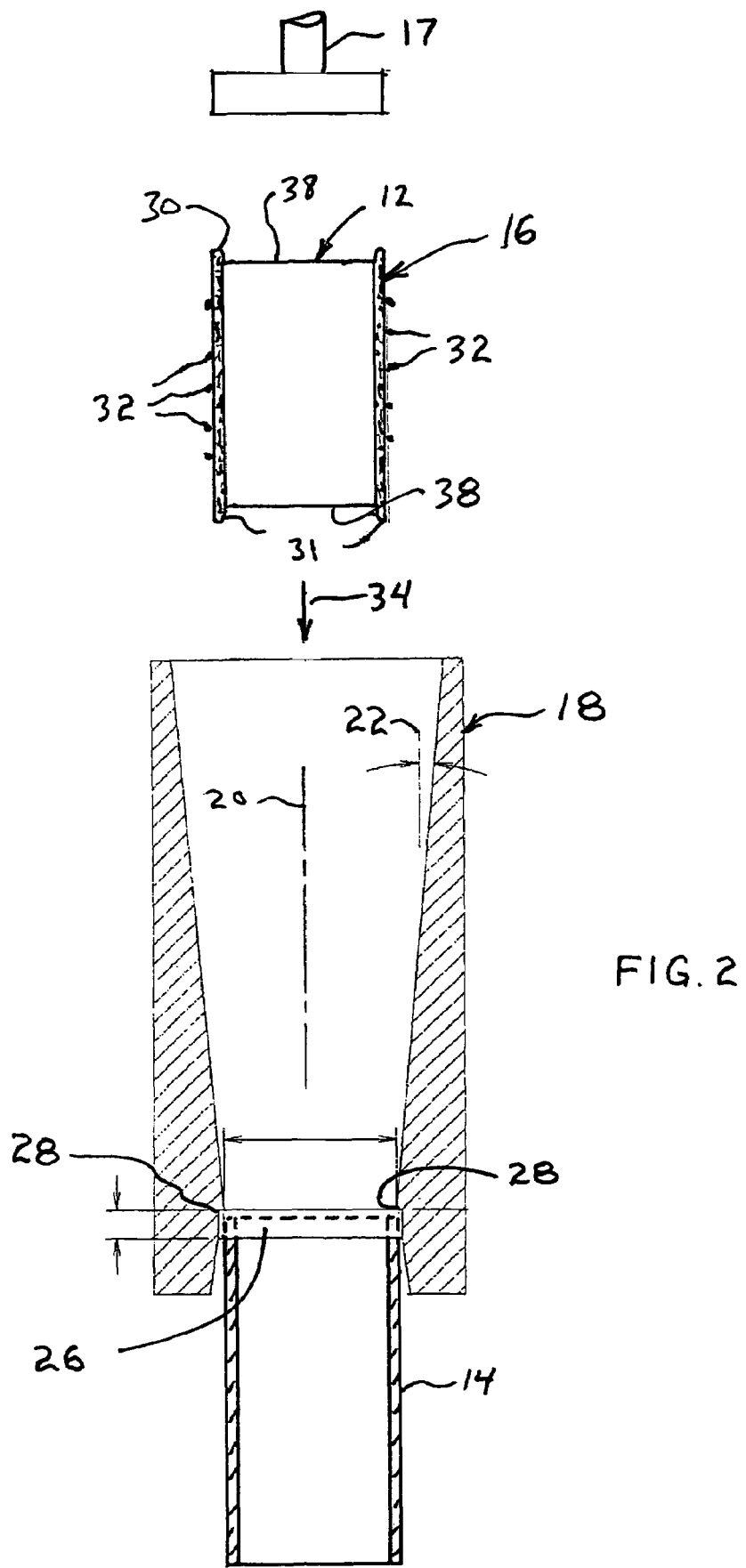
FIG. 2 is a cross-sectional view in elevation of apparatus for inserting a catalytic core into a mantle.

As shown in FIG. 2, the process of inserting the catalytic core 12 into the mantle 14 preferably involves the use of a compression tool 18. The compression tool 18 has tapered interior walls that are preferably circular in cross-section, and preferably they have an angle 22, with respect to the axis 20 of the compression tool 18, that is within the range of from about 3 to about 10 degrees, and most preferably an angle of about 5 degrees. At the output end 24 of the compression tool 18 is a cylindrical mantle receiving section 26 demarcated by a circumferential step 28. Although not shown, the smallest inside diameter of the compression tool 18 should be equal to or slightly less than the inside diameter of the straight-walled mantle so that the wrapped core will easily slide into the mantle. During insertion of the wrapped catalytic core 12 into the mantle 14, the mantle is positioned in the cylindrical mantle receiving section 26. The catalytic core 12, wrapped with the fibrous packing material 16 is pressed with a ram 17, or any other suitable device through the compression tool 18 and into the mantle 14.

Depending on the dimensions and density of the fibrous packing material 16, it is wrapped one or more times around the catalytic core 12, fully encasing the catalytic core's cylindrical exterior surface. Preferably, a high alumina mineral fiber mat, which is compressible in its thickness dimension, is wrapped only once around the catalytic core 12 such that the ends of the mat are made to abut one another. While thinner packing material mats, whose ends are beveled and overlapped, may be multi-wrapped around a catalytic core 12, it is preferable to avoid thin mats and to avoid mats having binder levels higher than about 10 percent by weight because of the resulting loss of overall mat compressibility. Unless corrugated or combined with compressible packing material mat layers, multiple wraps of thin paper-like mineral fiber sheets can lead to uneven and unacceptably high radial compression forces acting on the catalytic core 12. A preferred uncompressed thickness of the fibrous mat 16 is 0.5 inches for mats with areal density of about 725 g/m$^2$.

The width of the fibrous packing material 16, before it is wrapped around the catalytic core 12, approximately corresponds to the overall length of the catalytic core 12 in its flow direction. Preferably, the fibrous packing material 16 is slightly wider than the length of the catalytic core 12, resulting in overlapping tails 30 and 31. This relaxes stringent axial alignment requirements between the fibrous packing material 16 and the catalytic core, and allows a cushioned surface for pushing the catalytic core wrapped in the fibrous packing material 16 into the mantle. Optionally, the fibrous packing material 16 is temporarily held in place against the catalytic core by means of a thread 32 wrapped around the fibrous packing material 16. The thread can be of any suitable material, such as a fine cotton or polyester thread, or a blend of the two materials.

In order to protect the ceramic catalytic core 12 during the manufacturing of the catalytic insert 10, the face 38 of the catalytic core is preferably protected with a temporary cover, not shown, on the face 38. An adhesive tape material can be used, although other materials can also be used. During the insertion of the wrapped catalytic core 12 through the compression tool 18 and into the mantle 14, in the direction of the arrow 34, the overlapping tail 30 of the fibrous packing material 16 folds over the face 38 of the catalytic core 12. This presents a generally annular accumulation of fibrous packing material 16 at the outer circumference of the face 38 of the catalytic core 12 for contact with the surface of the ram 17 during the pushing of the wrapped catalytic core into a straight-walled stainless steel mantle. By pushing on the circumferential edges of the catalytic core 12, the force is applied at the location of the resistance or drag arising from the shear of the fibrous packing material 16 against the interior walls of the mantle. In this manner, the pushing force is desirably concentrated around the circumferential edge of the catalytic core 12, as opposed to being evenly applied across the entire face 38 of the catalytic core 12.

The other tail 31 of overlapping material is beneficial during insertion of the wrapped catalytic core 12 because the material folds across the face 38 of the catalytic core 12 to help pull the remaining fibrous packing material 16 through the length of the mantle 14 without significant slipping of the fibrous packing material 16 relative to the catalytic core 12.

Figure 3:
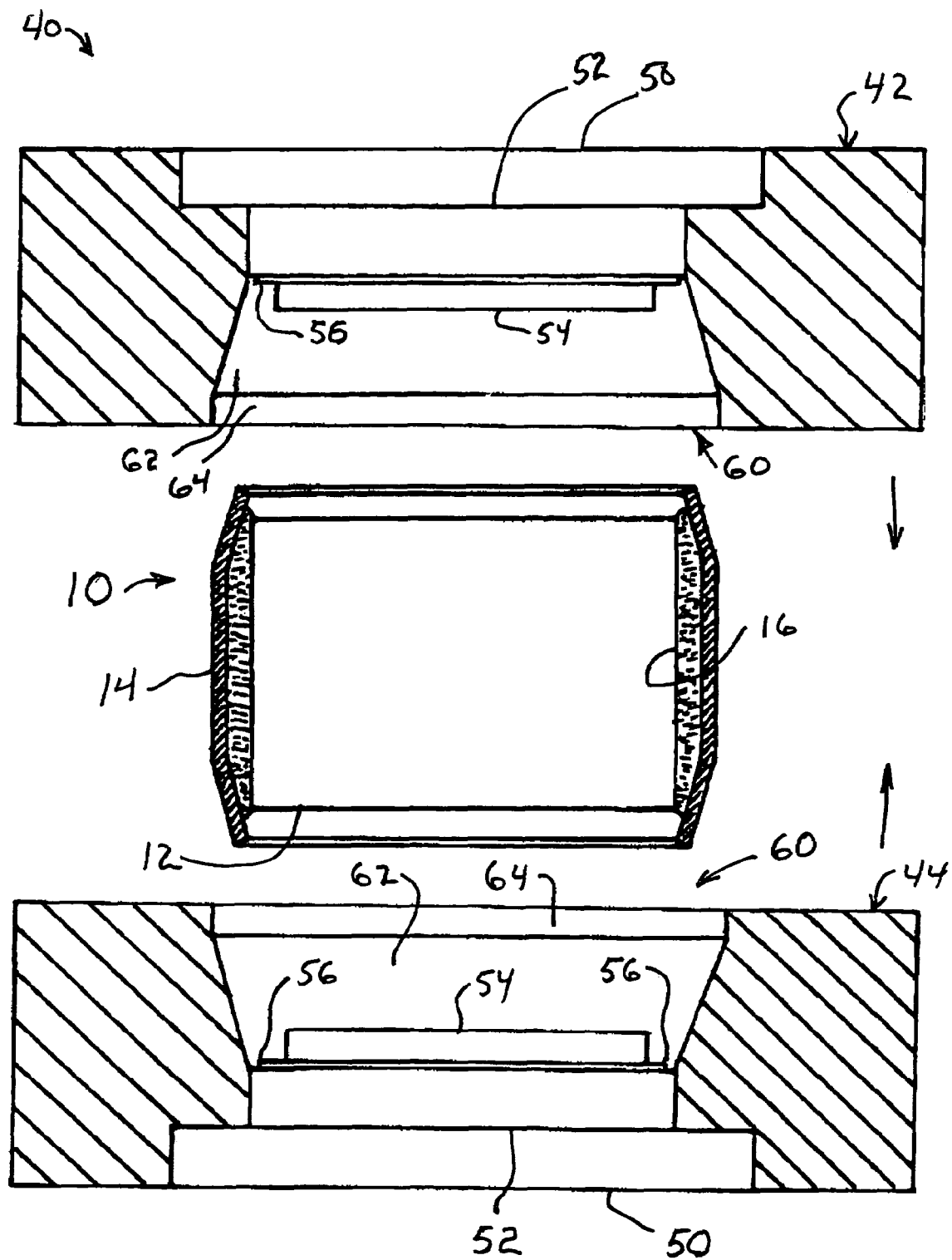
FIG. 3 is a cross-sectional view in elevation of a forming apparatus for forming the insert.

As shown in FIG. 3, the die assembly 40 for forming the catalytic insert 10 is generally comprised of upper die block 42 and lower die block 44. The two die blocks are mounted for reciprocation relative to each other. Either one of the two die blocks 42 and 44 can be mounted for reciprocation toward the other, or, alternatively, they can both be mounted for reciprocation toward each other. The movement of the die blocks during the forming process can be accomplished by any suitable means, such as by means of a hydraulic press apparatus, not shown. During the forming process portions of the mantle 14 are formed into conical taper shapes, thereby forming the catalytic insert 48, shown in FIG. 3, suitable for use in catalytic converters.

The upper die block 42 includes a mounting shoulder 50, a plunger body 52 of lesser diameter than the diameter of the mounting shoulder 50, and a locating stop 54 of lesser diameter of the diameter of the plunger body 52. The plunger body 52 includes a shoulder 56 having a slightly lesser diameter than that of the plunger body 52. The mounting shoulder 50, plunger body 52, shoulder 56 and locating stop 54 can all be assembled together and added as a unit or assembly to the die block 42. A die forming cavity 60 is defined by the die block 42 for receiving the insert during the forming process. The die forming cavity includes a tapered wall portion 62 and a straight or cylindrical walled section 64. In a preferred embodiment of the invention, the lower die block 44 is substantially identical but inverted relative to the upper die block 42.

Once the wrapped catalytic core 12 has been inserted into the mantle, the mantle is ready to be formed about the wrapped catalytic core 12. When the die blocks 42, 44 move together, the upper and lower ends of the mantle are forced into the tapered wall portion 62 of the forming cavity 60 and formed into a similarly inward tapered shape, as shown in the finished, formed insert 48. The tapered form of the formed catalytic insert 48 is comprised of converging tapered end portions 70 of the mantle 14 and an intermediate portion 72 of the mantle 14. Preferably, the angle of the taper in the tapered end portions, as indicated at 74 in FIG. 1, is within the range of from about 2 to about 30 degrees, and more preferably is within the range of from about 12 to about 18 degrees. Most preferably, the angle 74 is about 15 degrees. The forming of the tapered ends of the metallic mantle causes the fibrous packing material 16 at the end portions 70 to be at a greater density than the density of the fibrous packing at the intermediate portion 72. Accurate retention means for locating the catalytic core 12 also includes centering the catalytic core 12 in the radial direction. Therefore, it is important that the fibrous packing 16 wrapping procedure and the dimensions of the packing material 16 permit accurate centering during the metal forming cycle.

At the end of the forming stroke, when the fully formed mantle is seated against the tapered portion 62 of the cavity, the upper end 76 of the mantle (shown in FIG. 1) impinges on the shoulder 56 and is thereby prevented from continuing to flow or form radially inwardly. Instead, the resistance to further upward movement of the mantle 14 with respect to the upper die 42 is encountered in the form of shoulder 56, and the hydraulic mechanism is reversed to begin the separation of the die blocks 42, 44, and to initiate the disengagement process. Also, at the end of the forming stroke the locating stop 54 engages the face 38 of the catalytic core 12 to maintain the central position of the core 12 relative to the mantle 14. This is needed since, although it is desirable for the forming of each end be accomplished simultaneously, the forming of the taper at one end may be concluded slightly before that of the other end. This will ensure that the catalytic core 12 will be gently and accurately located within the center of the formed mantle.

Figure 4:
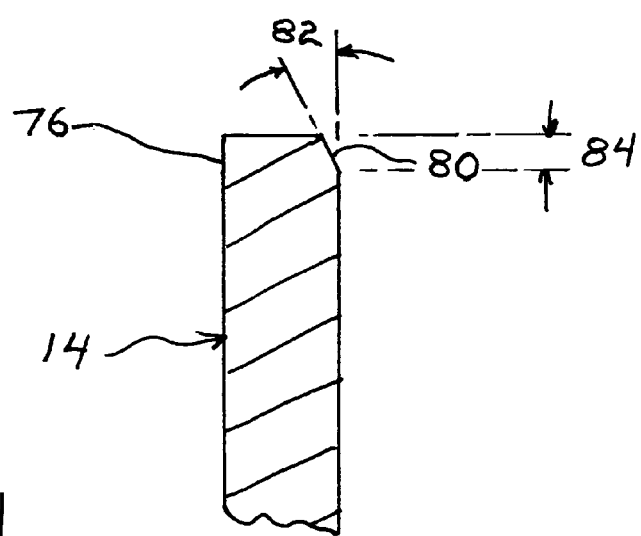
FIG. 4 is a cross-sectional in elevation showing chamfered ends of the mantle.

In order to facilitate the metal forming process, in which the opposed ends 76 of the mantle 14 are to be swaged or formed into conical, tapered shapes, the exterior circular edges of the mantle ends 76 are preferably beveled prior to insertion of the wrapped catalytic core 12 assembly into the straight walled mantle 14. This beveled shape is shown in FIG. 4. The chamfering of the ends 76 of the mantle permits a lower forming pressure during the forming process, thereby reducing the possibility of the mantle sidewall's buckling in the axial direction. This is particularly helpful for thin-walled mantles in which the wall thickness is on the order of about 0.010 to about 0.040 inches. The bevel or chamfer 80 can be to any extent suitable to facilitate the forming process. Preferably, the bevel or chamfer is at an angle 82 within the range of from about 15 to about 45 degrees. Also, preferably, the vertical or axial length 84 of the cut off portion defined by the beveled face 80 is within the range of from about 0.007 to about 0.018 inches. The beveling or chamfering of the ends 76 of the mantle provides for a smooth, uniform, and repeatable metal forming action that also gently and reliably post-compresses the fibrous packing material 16 against the catalytic core 12. Further, the end chamfer reduces forming tool wear dramatically and allows swaging without forming lubricants. This is an important consideration since the catalytic core 12 cannot be allowed to be contaminated. An optional additional step is de-burring the interior edge of the ends 76 of the mantle.

Preferably, the die forming operation should be performed at room temperature in a hydraulic press. These types of presses are known for their excellent control of the entire metal-forming cycle from a variable advance-pressing speed and for their process sensing capabilities. In order to limit the amount of densification of the packing material 16 during the forming process, which could damage the catalytic core 12, the final press speed should be within the range of from about 10 to about 15 inches per minute. Preferably, the stroke is about ½ inch total. Also, preferably, the stroke is carried out at a stroke duration that is greater than or equal to 3 seconds. This affords the beneficial nesting of fibers in the packing material 16. Such nesting is a time and temperature-dependent function. The forming cycle of the hydraulic press is preferably concluded when an installed hydraulic fluid pressure switch, not shown, detects a preset condition. One such condition could be an increase in pressure that occurs when both conical tapers of the formed mantle 14 are fully seated against their stops, i.e., shoulder 56 on the plunger body 52. Preferably, the die assembly 40 is provided with an unloading valve that immediately relieves the hydraulic pressure acting on the die blocks 42, 44, and initiates a retract cycle when an increase in pressure is detected.

Once the forming cycle is complete, and the mantle and captive catalytic core 12 have been formed into the catalytic insert 10, the insert 10 is removed from the die blocks 42, 44. Preferably, excess packing material 16 overhanging onto the face 38 of the catalytic core 12 is removed. A shaped plastic tool which conforms to the end dimensions of the catalytic core 12 and the short tapered ends 76 of the metal mantle can be used to abrade the excess packing material. In this way, the remaining packing material 16 exactly conforms to the desired shape for retention of the catalytic core 12 within the mantle 14 without obstructing any of the elongated passageways of the catalytic core. In practice, a small amount of fibrous packing material may be left overhanging the cylindrical wall of the catalytic core 12 in order to provide a complete gas-tight seal between the catalytic core 12 and the mantle, as long as the overhanging material does not obstruct the elongated passageways. As disclosed above, the catalytic insert 10 of the invention is suitable for insertion into an exhaust system for catalytic reaction with exhaust gases for a reduction in undesirable aspects of the exhaust gas. An advantage of the catalytic insert 10 is that the tapered ends of the mantle are potentially free for incorporation into the exhaust system of the vehicle or other application, by any suitable process, such as by welding.

During the metal forming operation, compressive forces are applied to the fibrous packing 16 in the hoop (circumferential), radial, and axial directions. This is advantageous in that the wrapped density of the fibrous packing material is compressed to a relatively high densification exclusively at the ends of the catalytic core 12. This can be accomplished without transposing the total force of the metal forming operation directly on the catalytic core 12 in the radial direction. Fibrous material under compression does not behave multi-axially in the manner of hydraulic forces associated with fluids. Preferably, the compressive strength of the fibrous packing at the end of the mantle after the metal forming step is within the range of from about 200 to about 800 pounds per square inch (psi), under a compressive deflection of about 5 percent, when tested at room temperature. This is measured by probing the annular space occupied by the fibrous packing 16 after the forming process. This densification of the fibrous packing material 16 prevents any exhaust gases from bypassing the catalytic core 12, and eliminates the need for additional protection from exhaust gas erosion. The packing material also provides a satisfactory grip on the catalytic core 12, even at high engine exhaust temperatures and pressures. The densification of the fibrous packing material 16 also generates a graduated compression profile of the packing material, where the highest force applied to the catalytic core 12 is adjacent the end portions 70 of the mantle 14. Consequently, the entire length of the cylindrical catalytic core 12 is not highly loaded. This allows adjacent areas of the catalytic core 12, which are more lightly loaded, to assist the more highly loaded ends from buckling inward. Maximum compressive stress is only applied where needed.

In an example of a catalytic insert 10 made according to this invention, the insert had the following parameters.

| | |
|---|---|
| Diameter of the catalytic core 12 | 1.360 inches |
| Converging Taper angle of the beveled face 74 | 15 degrees |
| Straight side distance of tapered wall section | 0.226 inches |
| Tapered sidewall extension length (beyond face of catalytic core 12) | 0.112 inches |
| Inlet and outlet diameters of the mantle after forming | 1.375-1.380 inches |

The tapered sidewalls of the formed mantle provide a combination of sealing surfaces and protective barriers against incidental damage to the catalytic core 12. While the diameter of the formed mantle's inlet/outlet ends is a function of taper angle and length of the tapered portion, preferably the inside diameter of the mantle is only slightly larger than the outside diameter of the catalytic core 12. This provides the necessary interference between the mineral fiber wrapped catalytic core 12 and mantle to prevent any axial movement of the catalytic core 12 within the mantle. An advantage of the present invention over the prior art is that the intersection of the tapered sidewall portion of the mantle with the circular sidewall portion of the mantle of the present invention occurs along circles which are spaced-apart by a shorter distance than the length of the catalytic core 12. Prior art catalytic converter substrates assembled in mantles configured the intersection circle, or line, to occur at the ends, or a short distance beyond the ends, of the catalytic core 12. This is due to the fact that the prior art mantles were assembled by welding. The present invention avoids any welding steps by swaging, or metal-forming, the ends of a straight-walled mantle.

The present invention may be alternatively practiced by using metal honeycomb catalytic cores instead of ceramic ones. The outside of the metal honeycomb cylinder may be roughened in similar fashion to the roughening process used in conjunction with the ceramic catalytic cores, or, by texturing of the metal itself. One drawback, however, with using metal honeycomb catalytic cores in the close-coupled application described is that the metal, because of its higher specific heat than that of the ceramic material takes longer to heat up and light off. Another drawback is that metal honeycomb cylinders would tend to creep and distort over time and probably would be difficult to retain inside of their mantles.

A second alternative embodiment involves the use of smooth-surfaced, non-roughened, catalytic core 12 which is retained in place solely by relying on the conformal shaping of the mineral fiber fibrous packing 16 slightly overhanging the ends, or faces, of the catalytic core 12. Any excess overhanging fibers may be easily removed by the abrading step mentioned above.

A third alternative embodiment of the present invention uses two, narrow, laterally spaced-apart fibrous packing mats wrapped around the catalytic core's cylindrical surface, instead of just one. By having the fibrous packing overhanging the end faces of the catalytic core 12, which are temporarily retained by multiple wraps of the thread 32, the first fibrous packing wrap is prevented from being dislodged from its position on the catalytic core 12 during the step of pushing the core into the straight-walled mantle, due to the overhanging fibers' tendency to pull the trailing fibers along. An advantage of axially spaced-apart fibrous packing 16 wraps is that there is less heat transfer from the catalytic core 12 to the mantle. This helps the catalytic core 12 to heat up quicker. Also, this configuration uses less fibrous packing material.

A fourth alternative embodiment entails the use of non-tapered mantle ends. While tapered ends are preferable, metal forming dies may be configured to roll-over the ends of the mantle such that inwardly extending flanges are created. Forming pressures consequently would be higher and tool wear, likewise, would be increased. It is especially important that mantles destined for 90 degree flange-forming have chamfered ends. A 90 degree flanging operation would require special tool coatings which prolong tool life under severe forming conditions. The inward edge of the flanges would be made to coincide with, or slightly overhang, the outer periphery of the catalytic core 12. As disclosed previously, excess fibrous packing 16 material overhanging the ends of the catalytic core 12 may be practiced in this embodiment as well, including the abrading step. The over-hanging fibrous packing 16 material would space the catalytic core 12 away from the flanges. Alternatively, compressible mineral fiber washers or gaskets may be used as end spacers. In such a configuration, the sealing of the mantle against its end-use receiver would occur at least at one flange location. One advantage of 90 degree flanges is that a greater percentage of the consolidation or densification force acting on the fibrous packing 16 during the flange forming step is directed axially to the catalytic core 12. A second advantage it shares with previous embodiments is that no welding of the assembly is required.

It is to be understood that the application of the one or more catalyst coatings to the catalytic core 12 may be performed either before, or after, final assembly of the catalytic converter insert. Post application of the catalyst coating is preferred. Otherwise, the expensive platinum-group catalyst coating would need to be recovered from manufactured catalytic inserts which were either damaged during the manufacturing process or did not meet quality control standards.

As explained above, in one exemplary close-coupled application, when one or more inserts of the invention are installed in a vehicle's or small engine's exhaust system having one or more receptacles for catalytic converter inserts, the opposed, tapered surfaces of each insert are seated on its one end against a correspondingly tapered surface within the one or more exhaust manifold inlet ports and on its other end against the correspondingly tapered surface within the one or more exhaust outlet ports of the engine. A sealing relationship between the double-tapered mantle and at least one correspondingly tapered seat within either the engine exhaust port or the manifold inlet port is achieved when the two parts (manifold, engine) are fastened together during assembly of the exhaust manifold to the engine. A sealing relationship between the mantle of the invention and either, or both, the exhaust outlet port and the manifold inlet port ensures that the entire flow of exhaust gases passes through the catalytic core and is treated. An advantage of having two similarly tapered surfaces at the opposed ends of each insert is that the insert may be easily and reversibly installed in those applications which can afford and enjoy this convenience.

The principle and mode of operation of this invention have been described in its preferred embodiments. However, it should be noted that this invention may be practiced otherwise than as specifically illustrated and described without departing from its scope.

What is claimed is:

1. A method of forming an insert for a catalytic converter comprising:
   providing an open-ended, single piece mantle having end portions;
   wrapping a catalytic core with a fibrous packing;
   inserting the wrapped core into the mantle; and
   subsequently subjecting the mantle to a forming process that applies pressure to the end portions of the mantle to reshape the end portions into converging tapered portions capable of retaining the wrapped core in place within the mantle, wherein the forming process includes causing the end portions of the mantle to compress the fibrous packing at the end portions of the core so that the fibrous packing at the end portions of the core has a greater density than the density of the fibrous packing at an intermediate portion of the core.

2. The method of claim 1 in which the mantle is cylindrical prior to the forming process.

3. The method of claim 2 in which the fibrous packing has a wrapped density prior to the forming process, and in which the forming process compresses the fibrous packing at the end portions of the core to a density greater than the wrapped density.

4. The method of claim 1 in which the catalytic core has a face, and in which the forming process is carried out in a manner that leaves the face free of obstruction.

5. The method of claim 1 in which the angle of the tapered portions is within the range of from about 2 to about 30 degrees.

6. The method of claim 1 in which the angle of the tapered portions is within the range of from about 12 to about 18 degrees.

7. The method of claim 1 in which the forming process is carried out by pressing an end of the mantle into contact with a die block having a tapered surface.

8. The method of claim 7 in which the forming process includes pressing a second end of the mantle into contact with a second die block having a tapered surface at the same time as the pressing of the first end into contact with the first die block.

9. The method of claim 8 in which the pressing of the mantle of the die blocks is carried out with a stroke having a stroke duration that is greater than or equal to 3 seconds.

10. The method of claim 1 in which the end portions of the mantle are provided with a beveled surface prior to the forming process.

11. The method of claim 10 in which the bevel is at an angle within the range of from about 15 to about 45 degrees.

12. A method of forming an insert for a catalytic converter comprising:
    providing an open-ended, single piece mantle having end portions;
    providing a catalytic core having spaced apart ends;
    wrapping a catalytic core with a fibrous packing;
    inserting the wrapped core into the mantle; and
    subsequently subjecting the mantle to a forming process that applies pressure to the end portions of the mantle to reshape the end portions to retain the wrapped core in place within the mantle, wherein the forming process densities the fibrous packing at the ends of the catalytic core so that the fibrous packing at the end portions of the core has a greater density than the density of the fibrous packing at an intermediate portion of the core.

13. A method of forming an insert for a catalytic converter comprising:
    providing a single catalytic core having spaced apart ends;
    wrapping one end of the catalytic core with a first fibrous packing, and wrapping the other end of the catalytic core with a second fibrous packing, wherein the first fibrous packing is spaced apart from the second fibrous packing;
    inserting the wrapped core into a mantle; and
    subsequently subjecting the mantle to a forming process that applies pressure to the end portions of the mantle to reshape the end portions to retain the wrapped core in place within the mantle.

14. A method of forming an insert for a catalytic converter comprising:
    providing an open-ended, single piece mantle having end portions;
    wrapping a catalytic core with a fibrous packing;
    inserting the wrapped core into the mantle; and
    subsequently subjecting the mantle to a forming process that applies pressure to reshape the end portions of the mantle into inwardly extending flanges that compress the fibrous packing against the catalytic core, thereby retaining the wrapped core in place within the mantle.

15. The method of claim 14 including overlapping the ends of the core with fibrous packing.

16. The method of claim 14 including removing excess packing material overhanging onto the face of the catalytic core.

17. A method of forming an insert for a catalytic converter comprising:
    providing an open-ended, single piece mantle having end portions;
    wrapping a catalytic core with a fibrous packing, the catalytic core having spaced apart opposed ends and an exterior surface between the opposed ends, with the exterior surface of the catalytic core having end portions at each end of the catalytic core;
    inserting the wrapped core into the mantle; and
    subsequently forming end portions of the mantle at each end of the catalytic core into converging tapered portions to compress the fibrous packing between the converging tapered portions and the end portions of the catalytic core, with the converging tapered portions compressing the catalytic core from each end, thereby retaining the wrapped catalytic core in place within the mantle.

* * * * *

UNITED STATES PATENT AND TRADEMARK OFFICE
CERTIFICATE OF CORRECTION

| | | |
|---|---|---|
| PATENT NO. | : 7,587,819 B1 | Page 1 of 1 |
| APPLICATION NO. | : 10/744284 | |
| DATED | : September 15, 2009 | |
| INVENTOR(S) | : Herbert L. Hall, Jr. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1216 days.

Signed and Sealed this

Twenty-first Day of September, 2010

David J. Kappos
*Director of the United States Patent and Trademark Office*